Figure 1:
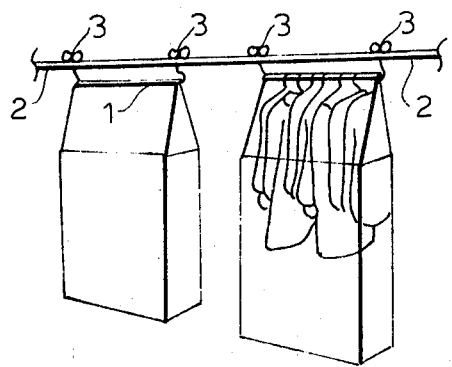

United States Patent [19]

Usner

[11] 4,079,840
[45] Mar. 21, 1978

[54] CLOTHES HANGER BRIDLE FOR A GARMENT TROLLEY BAR

[76] Inventor: Daniel C. Usner, 10958 Tanager Trail, Brecksville, Ohio 44141

[21] Appl. No.: 730,197

[22] Filed: Oct. 6, 1976

[51] Int. Cl.² ............................................. A47F 5/00
[52] U.S. Cl. ........................................ 211/124; 211/7
[58] Field of Search ................. 211/124, 7, 8, 89; 206/279, 285, 291

[56] References Cited

U.S. PATENT DOCUMENTS

| 2,685,962 | 8/1954 | Druth | 206/279 |
| 2,868,390 | 1/1959 | McCrone | 211/124 |
| 3,021,958 | 2/1962 | Winkler | 211/124 |
| 3,868,906 | 3/1975 | Cameron | 211/113 X |
| 3,921,814 | 11/1975 | Solomon | 211/124 X |

FOREIGN PATENT DOCUMENTS 1,299,385   7/1969   Germany ............... 211/124

Primary Examiner—Roy D. Frazier
Assistant Examiner—Robert W. Gibson, Jr.
Attorney, Agent, or Firm—Milton L. Simmons

[57] ABSTRACT

A clothes hanger bridle for a garment trolley bar is provided for the purpose of preventing displacement in transit of hanger-hung garments from said trolley bar.

1 Claim, 5 Drawing Figures

U.S. Patent     March 21, 1978     4,079,840

CLOTHES HANGER BRIDLE FOR A GARMENT TROLLEY BAR

In the garment trade, in transporting hanger-hung garments from wholesale to retail facilities, from warehouse to sales floor, etc., it is the practice to expedite such transfer by hanging the garments on a trolley bar at an initial point, and transferring the trolley bar from one trolley rail to another at various points in transit.

For example, at an initial point, a series of garments might be hung on a trolley bar rollably suspended from a trolley rail having a terminus at a truck loading platform. By the simple expedient of temporarily connecting said trolley rail terminus with a series of short trolley rails disposed in the ceiling of a delivery truck, the entire trolley bar load of garments may be rolled into the truck.

Upon delivery of the truck load of trolley-borne garments at an unloading platform, the procedure is reversed, and the trolley-borne garments are rolled out of the truck at their destination, on to a trolley rail, from whence the entire trolley load of garments may be readily and easily transferred to the next processing point for temporary storage, retailing, etc., via trolley.

One of the problems encountered heretofore is that, considering that garments may be both extremely expensive and light in color, the normal jostling and jarring in transit of the delivery truck inevitably results in a number of hanger-hung garments bouncing off the trolley bar onto the floor of the delivery truck, where they are frequently either irreparably soiled, or require special, expensive dry cleaning.

While a number of complicated hold-down devices have been utilized in the past, they tend to be unwieldy, awkward, and have little incentive for employees to use them properly, or indeed, to even use them at all.

It is therefore an object of this invention to provide a relatively simple, lightweight, efficient and effective trolley bar bridle for preventing the removal or displacement of garment hangers from a trolley bar due to normal vibration and bouncing generally incident to handling and/or truck transport.

As used herethroughout, "bridle" is intended to mean a trolley bar, garment hanger, hold-down device. So defined, throughout the specification and claims, repeated detailed description thereof is thereby obviated.

Figure 2:
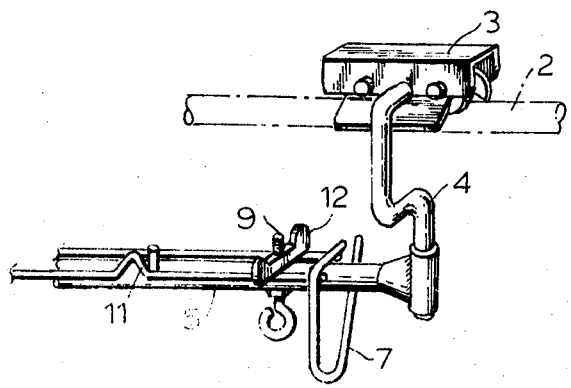
Figure 3:
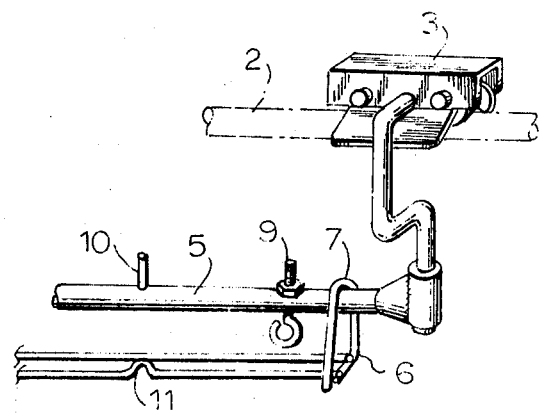
Figure 4:
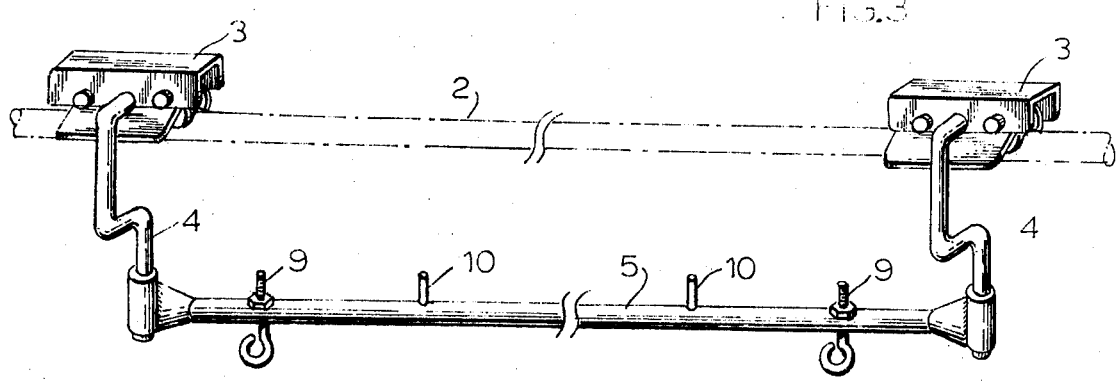
Figure 5:
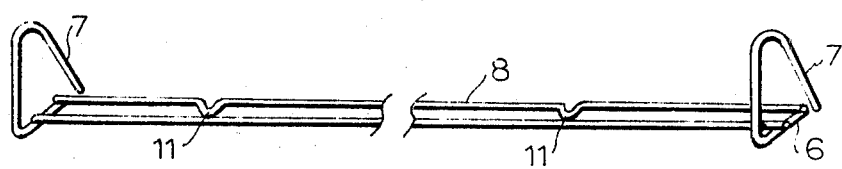

Referring now to the drawings attached hereto:

FIG. 1 is a general perspective view of a trolley bar hung with garments, rollably suspended from a trolley rail, having a protective wire cage hung therefrom, the latter of which forms no part of this invention; and FIG. 2 is a perspective view of the bridle of the invention mounted in locking position on a trolley bar; and FIG. 3 is a perspective view of the bridle of this invention in an unlocked position, mounted on a trolley bar; and FIG. 4 is a perspective view of the trolley bar of this invention disassociated from the bridle; and FIG. 5 is a perspective view of the bridle of this invention disassociated from the trolley bar.

Referring now to the drawings by way of describing the structure of this invention, FIG. 1 depicts a conventional trolley bar, generally designated as 1, which is suspended from tubular trolley rail 2 by two pairs of sheaves 3 at each end thereof.

As will be readily apparent, the trolley bar may be readily hung on to the trolley rail, and removed therefrom, by virtue of the offset arm 4; the trolley bar 5 itself suspended between sheaves 3 by arm 4, from which garment hangers may be hung.

Referring to FIG. 5, the bridle of this invention is fashioned from heavy duty, quarter-inch dia. wire and is designated generally by the reference numeral 6, said bridle having a pair of "J" hooks 7 at each end thereof, whereby the bridle may be readily hung from the trolley bar as shown in FIG. 3.

Bridle 6 may be mounted on the trolley bar by engaging one of the "J" hooks over an end of the generally circular trolley bar which has been flattened at its point of juncture with offset arm 4, whereby the entire bridle may be partially slid toward the opposite end, and the other "J" hook engaged to complete hanging the bridle from the trolley bar as depicted in FIG. 3. Optionally, the "J" hooks may be squeezed closed somewhat to prevent ready displacement of the bridle from the trolley bar. In its loading position as depicted in FIG. 3, the bridle 6 is readily pushed aside by an employee placing hangers on the trolley bar, thereby eliminating the need to remove the bridle during loading.

Following loading, the trolley bar is rotated and lifted to place hanger locking member 8 at the top of said bar, where it may be dropped into engaging relationship with threaded upright members 9, and vertical guide members 10.

The indented portions 11 in the locking member 8 reduces lateral displacement of the bridle in either direction by threaded upright members 9, while upright member 10 provides increased stability at the center, weakest point of said bridle.

After the bridle has been engaged over a load of hanger hung garments as described above and depicted in FIG. 2, self-threading wing nuts 12 may be screwed down over the threaded ends of upright members 9 thereby locking the bridle firmly against the garment hanger hooks, and restraining their removal due to vibration or bouncing in transport or handling.

As will be apparent, upright threaded members 9, as well as centrally disposed upright guide members 10 serve also to prevent linear displacement of hanger hung garments during transit, particularly if the trolley system within a warehousing facility for example, ascends or descends at a substantial angle with the horizontal, as frequently occurs in trolley transporting garments from one level to another.

While numerous optional variations of this invention may be effected without departing from the scope of the claims hereinafter set forth; and as shall be briefly touched upon hereinafter, the essence of this invention then is a clothes hanger bridle for a garment trolley bar, said bridle having a substantially straight, linear clothes hanger restraining member, said restraining member having means spaced apart toward each end thereof for swingably and rotatably suspending said restraining member beneath and from said trolley bar and in loose proximity therebeneath, said trolley bar having means disposed atop thereof for coactively engaging said restraining member and maintaining same along the top of said bar, and clamping means on said bar for tightening said restraining member against the top of said bar.

In order to minimize loss and expedite loading, the wing nuts 12 may be designed with a rotatable collar attached to a thong, in turn attached either to trolley bar 5 or bridle 6 so that when the bridle is rotated into locking position, each wing nut is readily available for fastening.

Too, threaded upright members 9 are not necessarily limited to two, and depending upon the length of the trolley bar, they may be increased, as well as the corresponding detent indentations 11 to provide additional restraint against linear displacement of both the bridle and garment hangers. The same applies to unthreaded upright member 10.

And, while the preferred embodiment hereof utilizes "J" hooks 7 for swingably suspending the bridle from the trolley bar during loading, any other suitable means for swingably mounting the bridle during loading, permitting its rotation into locking position, is contemplated by this invention.

Nor need the bridle necessarily be constructed of quarter-inch wire, which was utilized for the purposes of this disclosure for simplicity and economy. Furthermore, while there is disclosed wing nuts 12 over inverted threaded eye bolts, which provide threaded upright members 9, to hold the bridle in locked position, it is to be understood that any locking means would suffice so long as, upon disengagement, the bridle could be swingably rotated below the trolley bar, generally in loading position as depicted in the FIG. 3.

Having thus described the invention hereof, I claim:

1. A clothes hanger bridle for a garment trolley bar, said bridle having a substantially straight, linear clothes hanger restraining member, said restraining member having two hooks spaced apart toward each end thereof for swingably and rotatably suspending said restraining member beneath and from said trolley bar in loose, substantially parallel proximity therebeneath in garment loading position, said restraining member having an opening centrally disposed along its linear dimension, said trolley bar having at least two vertical upright members disposed atop thereof for coactively engaging said restraining member by protruding through said opening therein and maintaining same along the top of said bar when said restraining member is rotated to the top of said bar into locking position, and clamping means on said vertical upright members for tightening said restraining member toward the top of said bar, while said vertical upright members protrude through said opening in said restraining member when the latter is in locking position.

* * * * *